(12) United States Patent
Mueller

(10) Patent No.: US 10,870,990 B1
(45) Date of Patent: Dec. 22, 2020

(54) CLOSED PANEL BUILDING SYSTEMS

(71) Applicant: Peter Mueller, Berkeley, CA (US)

(72) Inventor: Peter Mueller, Berkeley, CA (US)

(73) Assignee: Peter Baruch Mueller, Berkeley, CA (US)

( * ) Notice: Subject to any disclaimer, the term of this patent is extended or adjusted under 35 U.S.C. 154(b) by 0 days.

(21) Appl. No.: 16/659,433

(22) Filed: Oct. 21, 2019

Related U.S. Application Data

(60) Provisional application No. 62/846,539, filed on May 10, 2019.

(51) Int. Cl.
| | |
|---|---|
| *E04C 2/38* | (2006.01) |
| *E04B 1/94* | (2006.01) |
| *E04B 1/24* | (2006.01) |
| *H02G 3/22* | (2006.01) |

(52) U.S. Cl.
CPC ............... *E04C 2/38* (2013.01); *E04B 1/24* (2013.01); *E04B 1/94* (2013.01); *H02G 3/22* (2013.01); *E04B 2001/2481* (2013.01)

(58) Field of Classification Search
CPC .... E04C 2/38; H02G 3/22; E04B 1/94; E04B 1/24; E04B 2001/2481
USPC ........................................................ 52/782.1
See application file for complete search history.

(56) References Cited

U.S. PATENT DOCUMENTS

| | | | | |
|---|---|---|---|---|
| 3,971,172 | A * | 7/1976 | Gentil ...................... | E04B 7/00 52/28 |
| 4,567,699 | A * | 2/1986 | McClellan ................ | E04B 2/82 52/127.7 |
| 7,930,857 | B2 | 4/2011 | Pope | |
| 8,898,974 | B1 * | 12/2014 | Gardner ................... | H02G 3/00 52/220.8 |
| 9,003,732 | B2 * | 4/2015 | Behrens ................... | E04B 2/827 52/243.1 |
| 9,010,060 | B2 * | 4/2015 | Rapaz ...................... | E04B 5/026 52/592.1 |

(Continued)

FOREIGN PATENT DOCUMENTS

| | | | | |
|---|---|---|---|---|
| AU | | 663959 B2 | 10/1995 | |
| CA | | 2789635 A1 * | 8/2011 | ............. E04C 2/386 |

(Continued)

OTHER PUBLICATIONS

Notice of Allowance, "Notice of Allowance dated Apr. 4, 2020," U.S. Appl. No. 15/994,594, dated Apr. 4, 2020, 7 Pages.

(Continued)

*Primary Examiner* — Jeanette E Chapman
(74) *Attorney, Agent, or Firm* — Platinum Intellectual Property LLP

(57) ABSTRACT

Approaches describe a panel system (e.g., a closed-, open-, and/or solid-panel system) that can be assembled quickly and easily in the field without field modifications to the panel. The panels can be precision engineered, and include a building connection system for structural and/or utility connection between building elements. An interpanel connector can include a structural connector, a utility connector, or a combination connector that is both a structural and utility connector. A control component or another appropriate component can be used to automatically facilitate coupling of one or more building elements, and provide feedback on the assembly process.

18 Claims, 14 Drawing Sheets

Market Street

(56) References Cited

U.S. PATENT DOCUMENTS

| | | | |
|---|---|---|---|
| 2001/0045070 A1* | 11/2001 | Hunt | E04B 5/04 52/284 |
| 2007/0130880 A1* | 6/2007 | Vega Perez | E04C 2/384 52/783.1 |
| 2008/0066392 A1 | 3/2008 | Sorensen | |
| 2009/0064625 A1* | 3/2009 | Takeshima | E04B 1/3404 52/649.2 |
| 2010/0163280 A1* | 7/2010 | Sasaki | F17C 13/00 174/152 R |
| 2010/0258683 A1* | 10/2010 | Kreutz | F16L 5/00 248/49 |
| 2010/0300010 A1* | 12/2010 | Vallejo | E04B 1/3211 52/30 |
| 2012/0167504 A1* | 7/2012 | McKinney | E04C 2/382 52/301 |
| 2012/0321029 A1* | 12/2012 | Bernauer | G21C 13/036 376/293 |
| 2013/0205713 A1* | 8/2013 | Redlberger | E04B 1/16 52/782.1 |
| 2014/0283465 A1* | 9/2014 | Ajasa-Adekunle | E04H 1/04 52/79.9 |
| 2015/0030387 A1 | 1/2015 | Poustchi | |
| 2015/0249328 A1* | 9/2015 | Hussey | H02B 1/305 174/50 |
| 2016/0122996 A1* | 5/2016 | Timberlake | E04C 5/0604 52/236.3 |
| 2017/0121968 A1* | 5/2017 | Sada | E04C 2/38 |
| 2018/0274704 A1* | 9/2018 | Mueller | F16L 21/002 |
| 2019/0210170 A1* | 7/2019 | Smith | B23C 9/00 |
| 2019/0271415 A1* | 9/2019 | Navon | H02G 15/013 |

FOREIGN PATENT DOCUMENTS

| | | | | |
|---|---|---|---|---|
| JP | 01169038 A | * | 7/1989 | |
| WO | WO-2004055283 A1 | * | 7/2004 | E04C 3/36 |
| WO | WO-2018067067 A1 | * | 4/2018 | E04C 2/04 |
| WO | 2018152589 A1 | | 8/2018 | |

OTHER PUBLICATIONS

Office Action, "Non-final Office Action dated Jun. 26, 2020," U.S. Appl. No. 15/994,594, dated Jun. 26, 2020, 15 pages.

Mahmoud Sayed-Ahmed, Khaled Sennah, Structural behavior of UHPFRC-Filled, Transverse C-Joint in Full depth, GFRP-reinforced, precast bridge deck panels resting over steel girders, May 27, 2015.

Scott D. Porter; J. Logan Julander; Marvin W. Halling, F.Asce; Paul J. Barr, ; Hugh, Flexural Testing of Precast Bridge Deck Panel Connections, May 3, 2011.

* cited by examiner

CLOSED PANEL BUILDING SYSTEMS

CROSS-REFERENCES TO RELATED APPLICATIONS

This application claims priority to U.S. Provisional Application No. 62/846,539, entitled CLOSED-PANEL BUILDING SYSTEMS," filed on May 10, 2019, which is incorporated herein by reference for all purposes.

BACKGROUND

As the need for more buildings and other structures increases, there is a corresponding increase in the need to efficiently construct such buildings and structures. One such approach uses prefabricated panels to reduce the overall construction timeframe of a project. In conventional approaches, however, the frame of a prefabricated panel is open on one side to allow an installer to attach the panel to other panels. Once the panels are connected, utilities and insulation can be installed in the open panels. Although in some situations such panels may reduce the overall construction timeframe of a building, a disadvantage to these panels, is the site installation of utilities, insulation and panel finishes. This requires additional time and resources, which increase the overall cost to the customer.

BRIEF DESCRIPTION OF THE DRAWINGS

Various embodiments in accordance with the present disclosure will be described with reference to the drawings, in which.

DETAILED DESCRIPTION

Figure 1A:
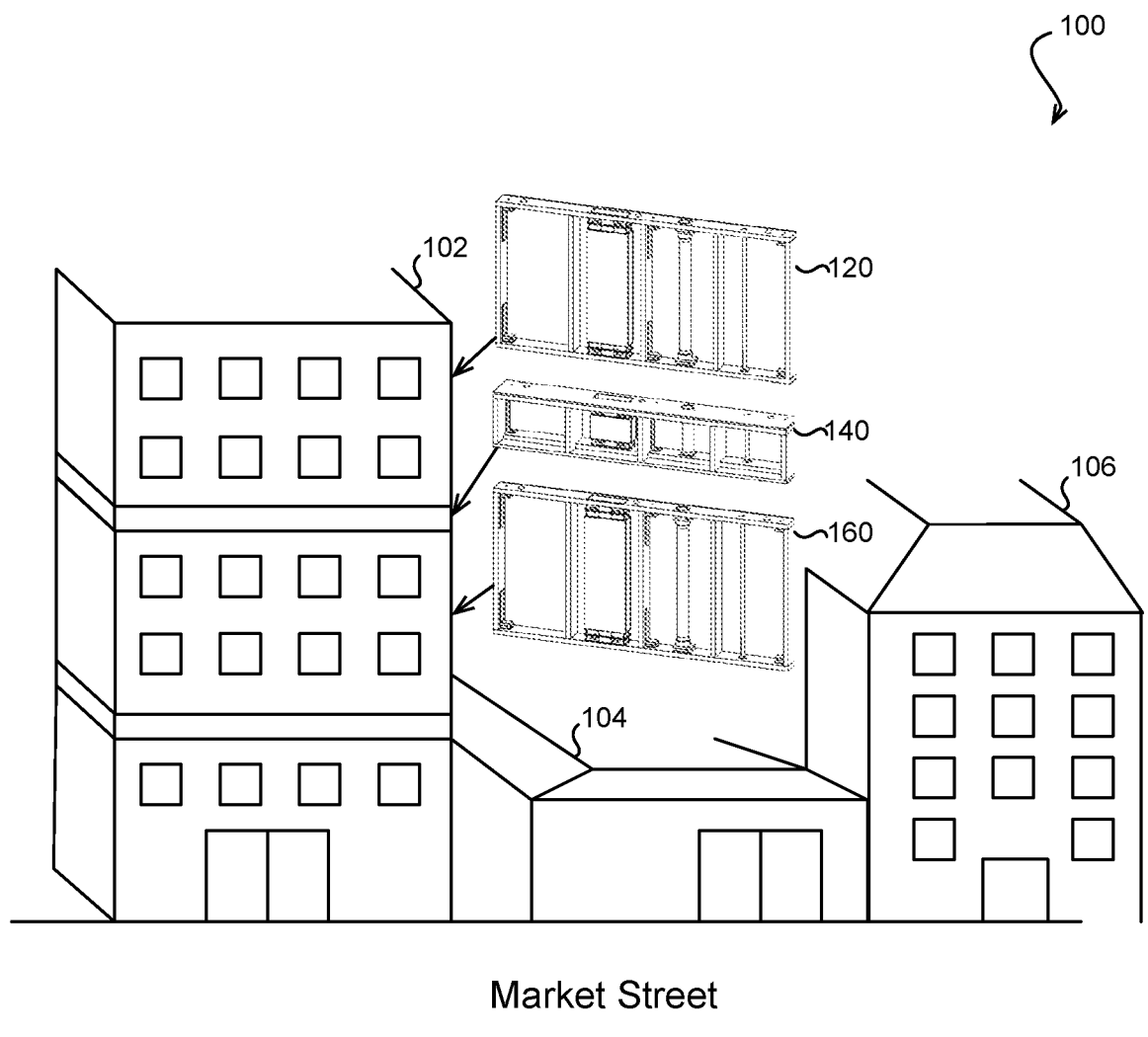
FIGS. 1A and 1B illustrate an example situation using a closed-panel building system in building construction in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure may overcome one or more of the aforementioned and other deficiencies experienced in conventional approaches to constructing buildings or other structures using prefabricated assemblies. In particular, various embodiments describe a panel system (e.g., a closed-, open-, and/or solid-panel system) that can assemble quickly and easily in the field (e.g., a construction site) without field modifications or at least minimal modifications to one or more panels. The panels in various embodiments can be precision engineered, and include a building connection system for structural and/or utility connection between building elements. The system can be automated such that a control component or another appropriate component can automatically facilitate coupling of one or more building elements and provide feedback on the assembly process.

For example, building elements such as a closed-panel can include interpanel connectors configured for structural and/or utility connection between building elements of a structure or other substantially closed cavity. An interpanel connector can include a structural connector, a utility connector, or a combination connector that is both a structural and utility connector. In an embodiment, a structural connector can be used to support at least a portion of a load associated with a structure and a utility connector can be used to transfer a utility through a portion of the structure. An example of a load can include, for example, weight distributed over one or more panels or building elements or other section of the structure. Examples of utilities include, for example, fluid (e.g., water, oil, lubricant, etc.), gas, electricity, communications data, air, plumbing, or waste. It should be noted that although the building elements described herein are closed-wall panels and closed-floor panels ("closed-panels"), embodiments described herein can also be in used in other types of building elements, for example, open-panel, solid-panel, bathroom pods or kitchen pods. It should also be noted that the connections ("interpanel connections") between building elements can be used for building elements that are open, closed, or solid fill.

In various embodiments, a control component can be used to automatically facilitate coupling of one or more building elements. For example, state information can be received at, for example, a control component or another appropriate component. The state information can be determined from, for example, information such as position information, environmental information, force information, resistance information, capacitance information, pressure information, stress information, torque information, alignment information, etc., associated with a connection between panels and/or interpanel connection components and collected by one or more sensors.

The state information can be compared to an appropriate threshold, such as a dimension stable threshold used to determine a change in dimension that is outside an acceptable deviation. Thresholds can include, for example, at least one of a position threshold, resistance threshold, capacitance threshold, inductance threshold, pressure threshold, torque threshold, stress threshold, temperature threshold, or humidity threshold.

A determination can be made whether the state information satisfies an appropriate threshold. In the situation where the state information satisfies the threshold, the next building element (e.g., panel and/or connector) can be processed. In certain embodiments, a notification can be presented. The notification can include at least one of a visual notification, an audible notification, a haptic notification, a digital signal, an analog signal, or an electronic message notification. In the situation where the state information does not satisfy the threshold, the state information can be processed to generate control information. The control information can be used to control one or more building elements. For example, control information can be used to adjust one of power, speed, orientation, location of an actuator. In another example, the control information can be used to cause an actuator to engage with a motion mechanism. Additionally, or alternatively, in certain embodiments, a notification can be presented indicating that the building elements have yet to be processed, manual inspection may be required, user-input is required, among other such actions. Thereafter, current state information is obtained and the process continues as described herein.

Various other functions and advantages are described and suggested below as may be provided in accordance with the various embodiments.

FIG. 1A illustrates an example situation 100 in which a panel building system is used in building construction in accordance with various embodiments. It should be understood that reference numbers are carried over between figures for similar components for purposes of simplicity of explanation, but such usage should not be construed as a limitation on the various embodiments unless otherwise stated. The panel building system can include closed-, open-, solid panels, a combination thereof, and the like. In an embodiment, a closed-panel is manufactured pre-fitted, service and utility channels routed, and in certain embodiments, elements such as windows, doors and plaster are already in place. In various embodiments, the external and internal walls of a closed-panel are complete. An open-panel is manufactured with the internal side of the panel element unsheathed. Insulation, service channels including utility channels such as electricity, water, waste, etc., building elements (e.g., windows, doors, plaster, etc.), and the like are taken care of at the construction site. In an embodiment, a solid-panel can include, for example, solid precast concrete with rebar; precast concrete sandwiching insulation. In certain embodiments, the solid-panel may include the same, more, or fewer construction elements as the closed-panel.

The building construction can include, for example, apartments, condominiums, single-family housing, multifamily housing, office building, retail, commercial, industrial, storage facility, partition walls and or other types of building. Although office building 102 is illustrated, it should be noted that various structures (e.g., high-rise buildings, houses, restaurants 104, co-working buildings 106) or other substantially closed structures/cavities and in certain embodiments open structures (e.g., office floor layouts) can be constructed as well using the closed-panel building system.

In this example, building 102 is constructed with wall panels 120, 160, and floor panel 140. In accordance with various embodiments, panels 120, 160, and 140 can enable an intelligent blind connection system which supports inter-panel connection components that can be used for structural and/or utility connection between panels. As used herein, blind connection refers to a connection where the mating surfaces of the male and female components of the connector are not visible to an external observer. In conventional building systems, the frame of a prefabricated panel is open on one side to allow an installer to attach a panel to other panels. Once the framing has been completed, utilities and insulation can then be installed in the open panels. Although in some situations such panels may reduce the overall construction time, a potential disadvantage to this method is that the utilities structural connectors, insulation and surface finishes still need to be site installed. This requires additional time and resources, which is inefficient. Further, many conventional open panels lack (1) dimensional precision of the frames, (2) dimensional stability over time with respect to environmental conditions (e.g., temperature and humidity), (3) precision in locating and mounting connection components within the frame of a closed-panel, (4) an intelligent blind connection system that works for both structural and utility (e.g., water, fluid, electrical, waste, venting, gas, air, HVAC, etc.) connections, (5) a means of communicating panel location and component connection feedback data and (6) means to address the imprecision in the foundation.

Deficiencies 1, 2, and 3 result in tolerance stack up problems. In general, tolerance stack-up occurs when two or more building elements have key features that should engage; however, the tolerancing of the dimensions of the parts cause a misalignment such that the engagement of the key features is no longer possible or at least requires more than a threshold effort. For the case of the closed-panel system, if the tolerance stack-up is greater than the ability of the connector subsystem to absorb that misalignment, then the connection may not be made. In various situations, there is more than one set of features that engage between two assemblies. This increases the probability that the engagement of one or both of the features will be compromised.

For example, consider a situation where 16 connections are to be made between a wall panel and its surrounding wall and floor panels. It is highly unlikely that all of those connections can be independently made given the lack of precision in conventional closed-panel systems. Furthermore, alignment depends on the accurate alignment of the panels as well as the accurate alignment of the utility connectors. Every connector adds a degree of complexity, making it difficult to achieve using conventional wall and floor panel construction methods.

Deficiencies 1, 2, 3, 4 and 6 are about the lack of precision of conventional panel systems. Deficiency 1, 2 and 3 can be addressed by the following:

1. Materials used are stable with respect to environmental conditions. For wood-based panels, the materials can be moisture sealed engineered wood, such as Laminated Veneer Lumber (LVL) Parallel Strand Lumber (PSL) Oriented Strand Board (OSB), engineered wood. glass and or composite reinforced material. Both LVL, PSL and OSB have low thermal expansion coefficients. A moisture seal provides a barrier to the ingress of moisture into the wood, which could induce dimensional changes to the frame.

2. Panels are machined using precision equipment such as computer numerical control (CNC) equipment. CNC machining is a manufacturing process in which pre-programmed computer software dictates the movement of factory tools and machinery. The process can be used to control a range of complex machinery, from sanders grinders and lathes to mills and routers. With CNC machining, three-dimensional cutting tasks can be accomplished in a single set of prompts. The accuracy of CNC equipment is dependent on the resolution of the feedback device in use—usually high-resolution digital encoders are used which have accuracy to $\frac{1}{1000}$th of a mm. This serves to both create the precise dimensional frame but also to precisely locate connector components within the frame.

Accordingly, in accordance with various embodiments, approaches describe herein a panel system (e.g., closed-, open-, and/or solid) that includes panels that include structural, utility, and/or a combination structural and utility connectors that can adjust for micro misalignment in the tolerance stake up of panel-to-panel placement, where the ability to adjust for micro misalignment can be represented as:

(tolerance of the placement of connector's mating halves)<(connector system's capacity to absorb a misalignment)   Eq (1)

Panel to Panel tolerance stake up+Panel misalignment−true position=connector absorption tolerance   Eq (2)

As is described herein, the structural connector is configured to enable at least one of support a portion of a load associated with the structure or align a pair of building panels of the plurality of building panels, and wherein the utility connector is configured to enable transfer of a utility through a portion of the structure, and wherein the combination structural and utility connector is configured to enable at least one of the support the portion of the load associated with the structure, align the pair of building panels of the plurality of building panels, or transfer the utility through the portion of the structure, and wherein the utility includes at least one of fluid, gas, electricity, communications data, air, or waste.

Figure 1B:
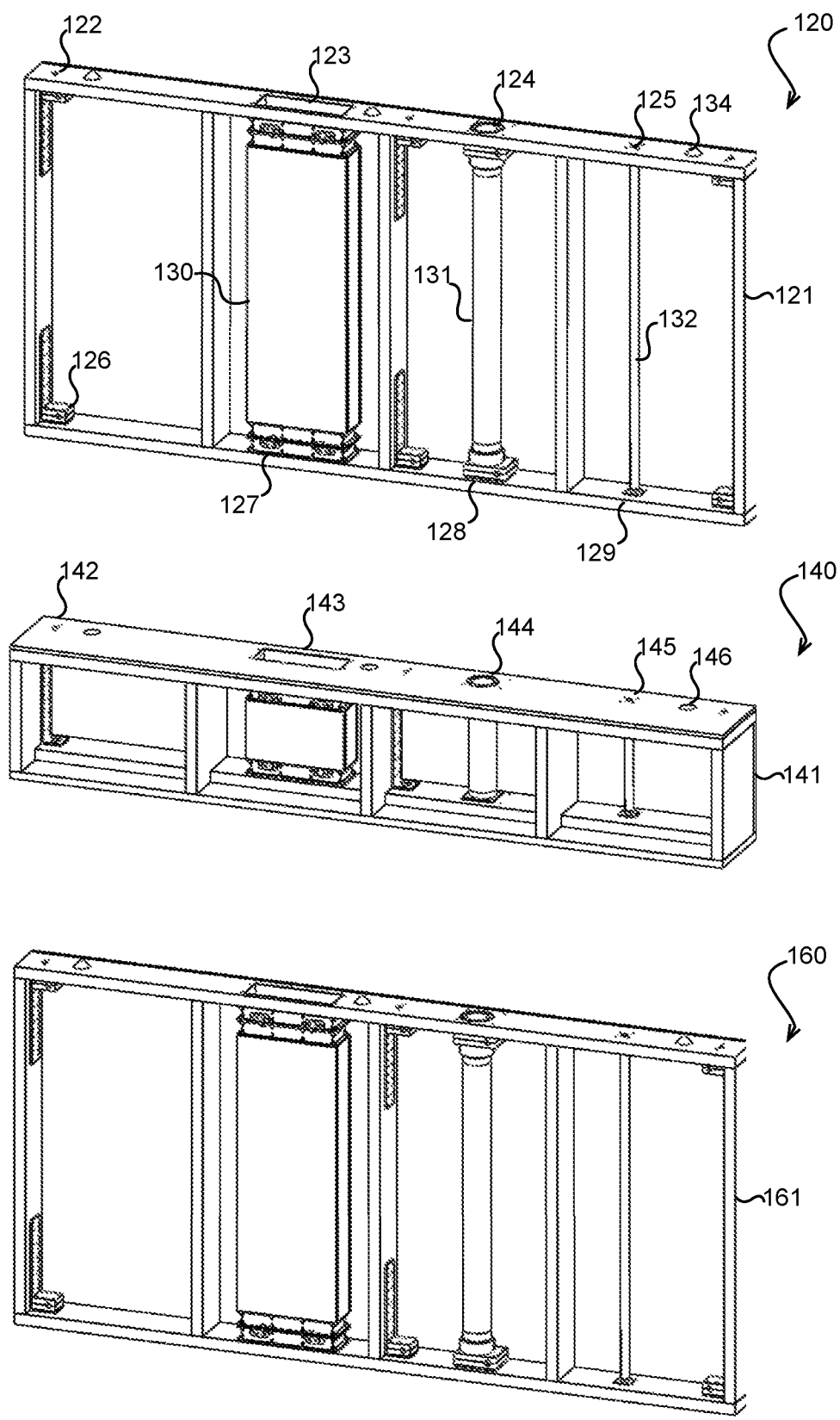

FIG. 1B illustrates panel alignment and connection of building panels 120, 140, 160. In one embodiment, the connections of wall panel 120 with floor panel 140, and of floor panel 140 with wall panel 160, provide structural support for building 102 and allows for transfer of utilities. The frame 121, 141, 161 of a building panel 120, 140, 160 can be precisely machined (e.g., by a CNC machining process) to provide mounting locations 122, 123, 124, 125 for connector system components.

In one embodiment, a structural connector component 126, an HVAC connector component 127, a water connector component 128, and an electrical connector component 129 are mounted and attached to the frame 121. Intra panel components are loaded into the wall at their corresponding connection component. In one embodiment, intra panel component of the ducting for the HVAC system 130 is placed into the wall and attached to the HVAC connector component 127. The intra panel component of the piping for plumbing 131 is placed into the wall and attached to the water connector component 128. The wire and/or conduit for the electrical system 132 is placed into the wall and attached to the electrical connector component 129.

In this example, an interpanel connection may be formed when the HVAC connector component 127 of wall panel 120 couples with HVAC connector component 143 of floor panel 127. Likewise, structural connector component 126 of wall panel 120 may couple with the structural connector component 142 of floor panel 140. Water connector component 128 of wall panel 120 may be coupled with water connector component 144 of floor panel 140. Electrical connector component 129 of wall panel 120 may be coupled with electrical connector component 145 of floor panel 140. Panels may be more complex in order to support the structural connection and utility transport between adjacent floor and wall panels.

In accordance with various embodiments, connections between wall panel 120 and floor panel 160 can be hybrid connections containing both structural connections and utility connections. Generally, the structural connections should engage first. The sequence of engagement provides the precision alignment to secure the utility connections and strain relief to isolate the utility connections from structural stresses. In other embodiments, connections can be formed between wall panel to wall panel, wall panel to floor panel, or floor panel to floor panel.

The frame 121, 141, 161 of building panels 120, 140, 160 may be made of materials that remain stable with respect to environmental conditions. Such materials may include moisture sealed engineered wood (e.g. Laminated Veneer Lumber (LVL) or (PSL) Parallel Strand Lumber Oriented Strand Board (OSB)), or engineered wood with glass reinforced composite mesh. The panels can include at least one of a moisture control barrier, a temperature control layer, a weathering layer, an insulation layer, a fire protection layer, a window frame, or a door frame. The material used to construct the panels can include, for example, at least one of plywood, densified wood, fiberboard, particle board, oriented strand board, laminated timber, laminated veneer, laminated veneer lumber, cross laminated timber, parallel strand lumber, laminated strand, transparent wood composites, composites, polymers, metals, or fiberglass mesh.

In an embodiment, the panels can have dimensional precision and stability. For example, the panels can be constructed such that a width dimension, a length dimension, and/or a height dimension satisfy respective dimension thresholds over a range of values for at least one environmental condition (e.g., temperature, humidity, etc.)

A panel alignment mechanism or element alignment embedded in a panel places building panels 120, 140, 160 in proper position prior to connection. The panel alignment mechanism can engage two adjacent panels with relatively large offset from true position and can reduce the offset as panel alignment elements become fully engaged. In this example, wall panel 120 may have a panel alignment element 134 on the top and bottom (not shown) of the frame 121. Floor panel 140 may have a panel alignment element 146 on top and bottom (not shown) of the frame 141. The panel alignment element at the bottom of the frame 121 engages with panel alignment element 146 on top of frame 141, forming panel alignment between building panels 120 and 140. In accordance with an embodiment, one way to distribute point loads at the structural connection to a different area of a panel is through the panel-to-panel alignment connectors. Another way to distribute the load of the structural connector is through multiple connection points from the connector to the frame. Additional details on the panel alignment mechanism will be discussed in FIG. 7, below.

Figure 2A:
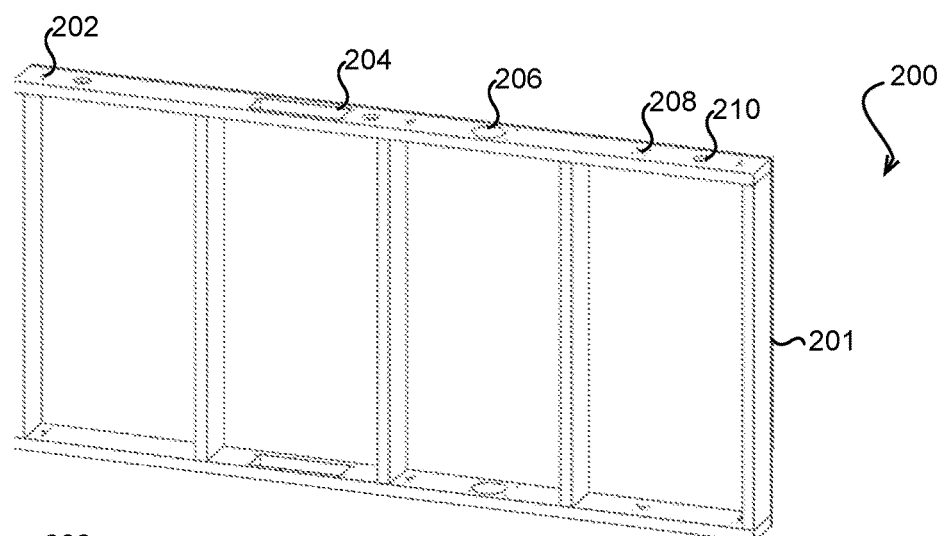
FIGS. 2A-2C illustrate a wall panel structural frame with machined features for mounting connector components and capable of being loaded with structural and MEP (Mechanical, Electrical, and Plumbing) systems in accordance with various embodiments.
Figure 2B:
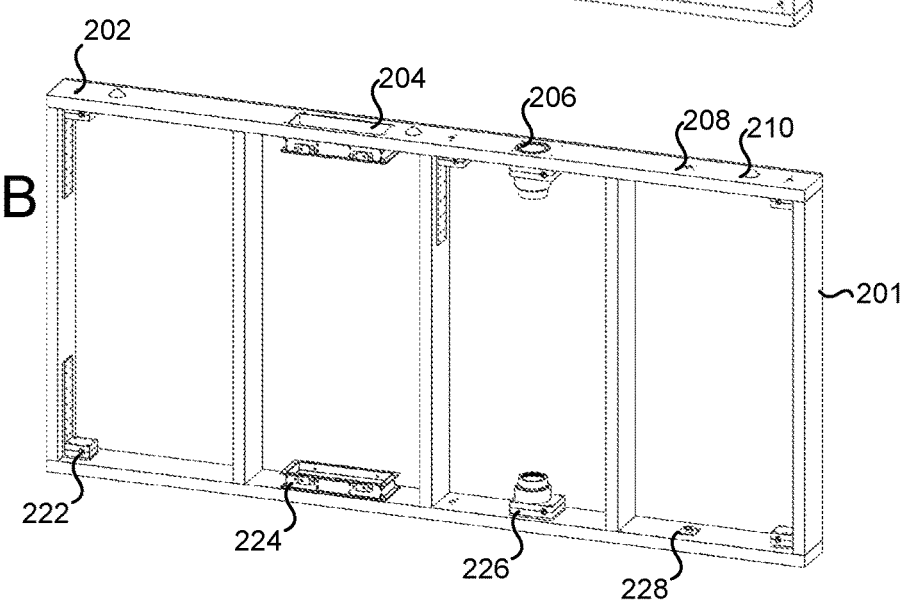
Figure 2C:
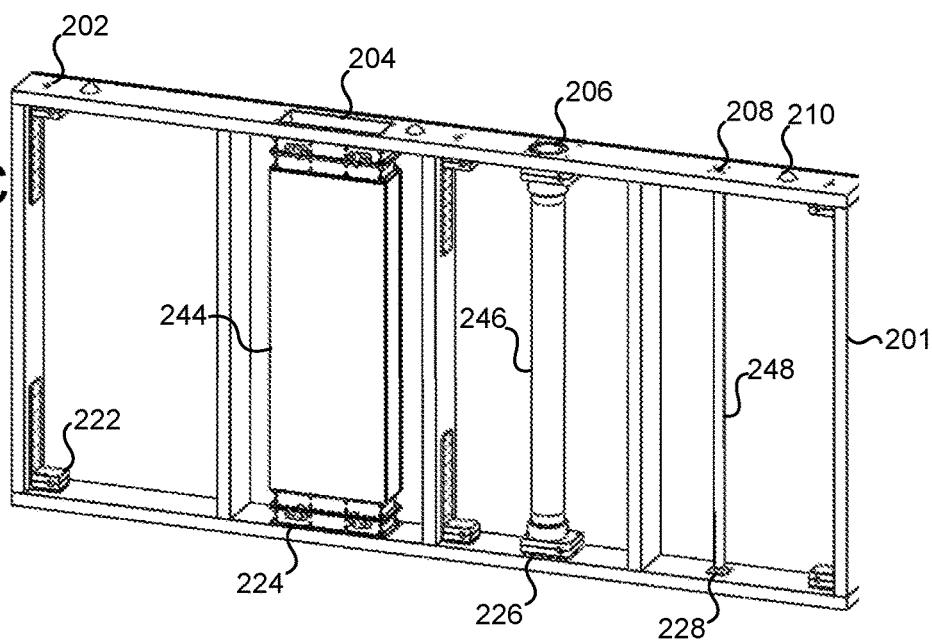

FIGS. 2A, 2B, and 2C illustrate the sequence of events 200 that enable the accurate placement of the components of the connector system in accordance with an embodiment. In this example, frame 201 is precisely machined (e.g. by a CNC machining process) to provide mounting locations 202, 204, 206, 208, 210 for one or more connector system components, as shown in FIG. 2A. Next, connector system components 222, 224, 226, 228 are mounted into and attached to the frame 201 as shown in FIG. 2B. Finally, FIG. 2C shows how the intra panel components (i.e., the ducting for an HVAC system 244, the piping for plumbing 246, and the wire and or conduit for an electrical system 248) are placed into frame 201. In accordance with an embodiment, one example placement approach includes precisely machining cutouts on frame 201 to provide a mounting location 202 to fit a structural connector component 222, a mounting location 204 to fit an HVAC connector component 224, a mounting location 206 to fit a water connector component 226, a mounting location 208 to fit an electrical connector component 228, and a mounting location 210 to fit a panel alignment element (for example, element 134 of FIG. 1B). This is followed by attaching structural connector component 222 to mounting location 202, attaching HVAC connector component 224 to mounting location 204, attaching water connector component 226 to mounting location 206, attaching electrical connector component 228 to mounting location 208, and attaching a panel alignment element to mounting location 210. The ducting for the HVAC system 244 is then attached to the HVAC connector component 224. The piping for plumbing 246 is attached to the water connector component 226. The wire and or conduit for the electrical system 248 is attached to the electrical connector component 228.

Figure 3A:
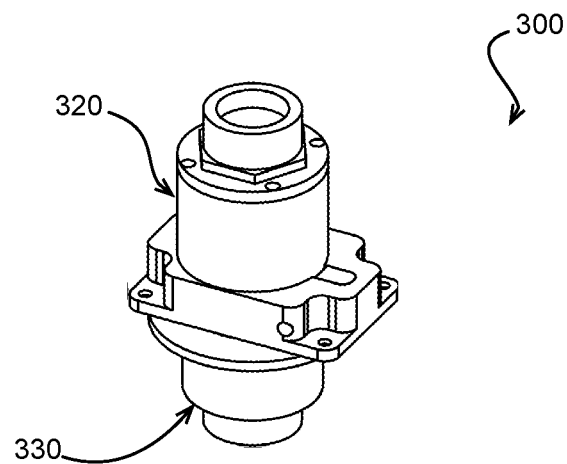
FIGS. 3A, 3B, and 3C illustrate an external mounted utility connector in accordance with an embodiment.
Figures 3B, 3C:
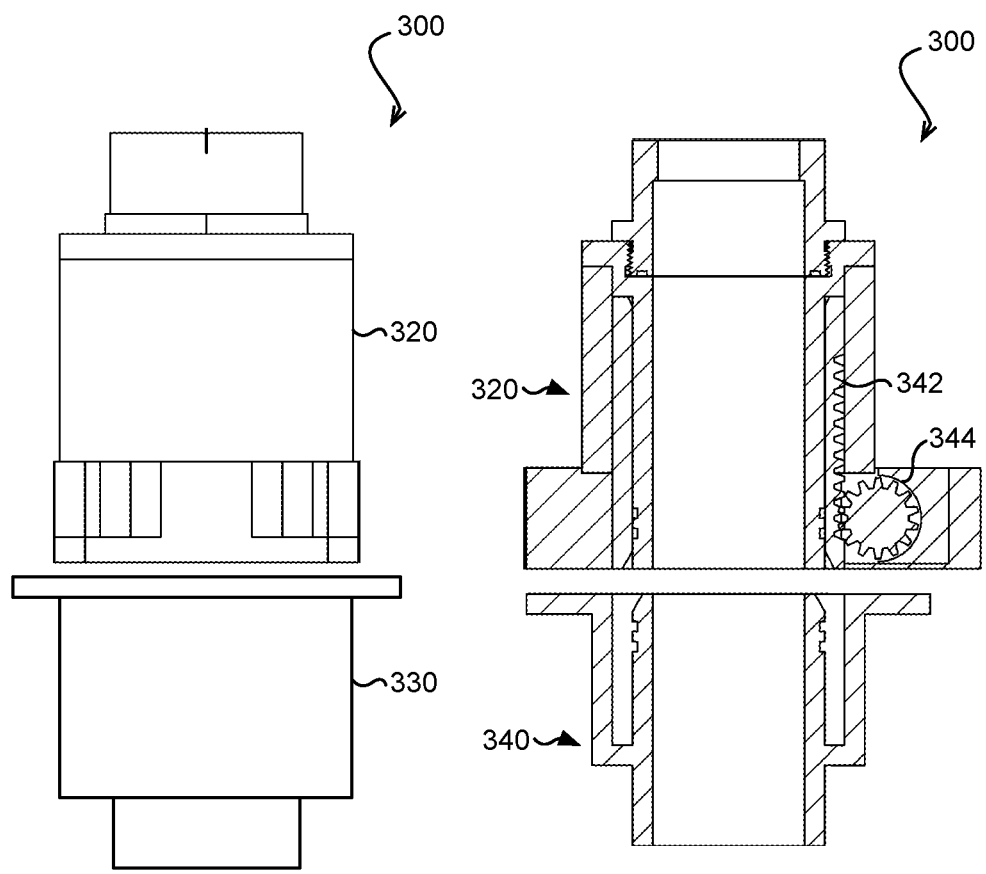
Figure 4:
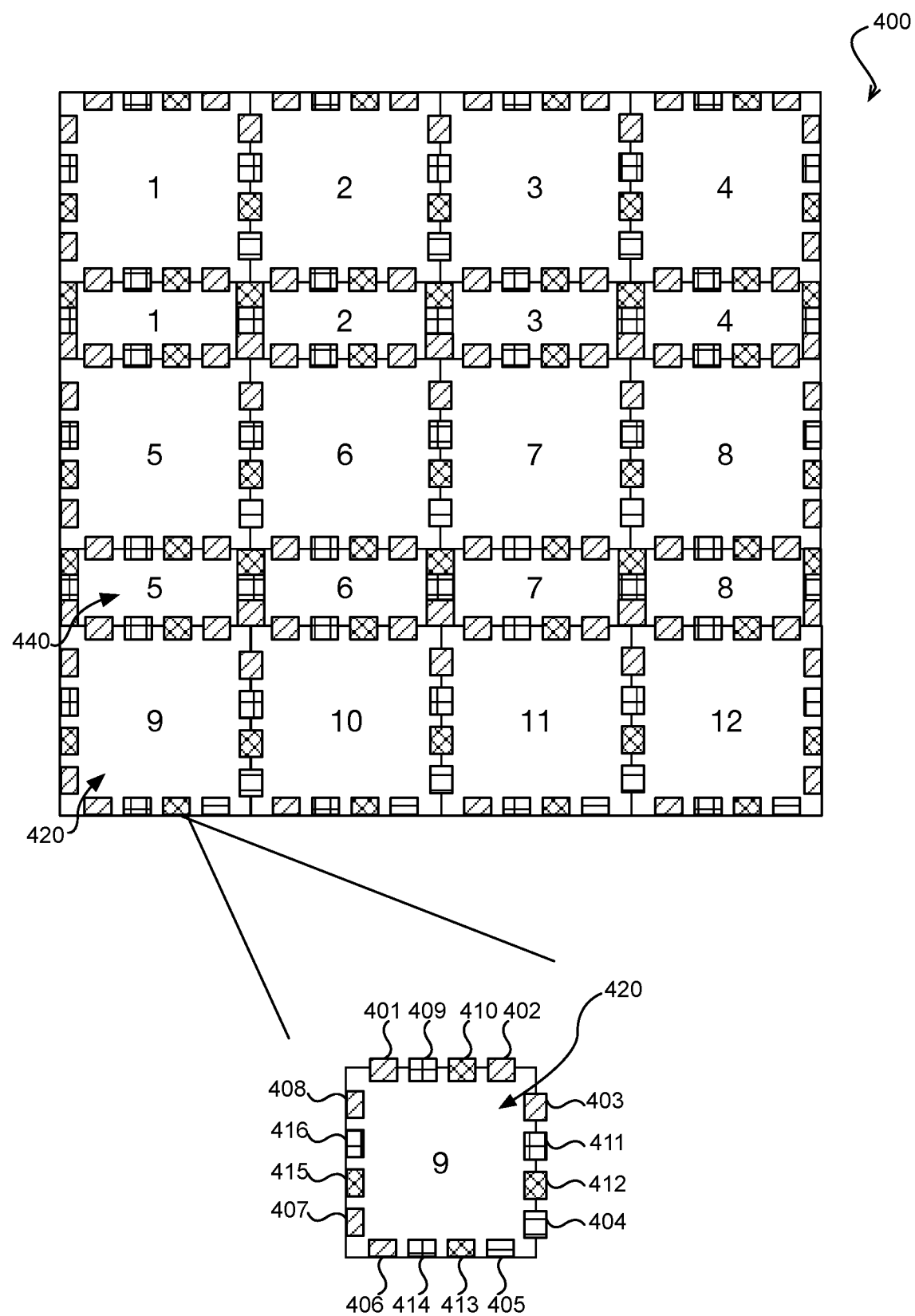
FIG. 4 illustrates the connections between adjacent wall and floor panels in accordance with various embodiments.

FIGS. 3A, 3B, and 3C and 3B illustrate an embodiment of a utility connector 300. FIG. 3A shows a front perspective view of utility connector 300. FIG. 3B shows a side view of utility connector 300. FIG. 3C shows a front sectional view of utility connector 300. As described, a utility connector can be used to transfer a utility through a portion of the structure. Examples of these utilities include, for example, electrical power, electrical communication, water plumbing, waste and vent plumbing, gas, mechanical venting. A utility connector can be, for example, externally mounted. In one embodiment, connector 300 connects to the frame from the outside of the panel. This enables the panels to be assembled prior to installing the utility connections. Utility connector 300 includes a first portion 320 and a second portion 330. The first portion 320 is mounted to the frame of a first panel. The second portion 330 is mounted to the frame of a second panel. The coupling of the first portion 320 and second portion 330 connects the panels, creating an interpanel connection and enabling transfer of a utility through utility connector 300. In an embodiment, the utility connector 300 is rack 342 and pinion 344 activated. In an embodiment, it can either be activated manually, by an electric source, a battery source, a hydraulic source, or a pneumatic source. The connector has sensors embedded in it to locate the position and verify that the connection is adequately made. The sensors provide feedback to the operator. The sensors can provide long term feedback over the life of the connector such as leak detection, material failure in a connector. The rack 342 and pinion 344 can be engaged by manual-based motion, pneumatic-based motion, hydraulic-based motion, electric-based motion, magnetic-based motion, or electro-magnetic-based motion FIG. 4 illustrates example 400 of the connections between adjacent wall 420 and floor 440 panels, in accordance with various embodiments. In this example wall panel 420 has 16 connections, with 8 structural connections 401, 402, 403, 404, 405, 406, 407, 408 and 8 utility connections 409, 410, 411, 412, 413, 414, 415, 416. In another embodiment, connections could be a hybrid containing both structural connections and utility connections. For example, connection 401 can be both a structural and utility connection. In accordance with an embodiment, the structural connections should engage first. This sequence of engagement provides the precision alignment to at least a threshold level to secure the utility connections and strain relief to isolate the utility connections from structural stresses. For example, structural connection 401 is engaged first to connect wall panel 420 and floor panel 440. Structural connection 402 is also engaged to connect wall panel 420 and floor panel 440. Then, utility connection 409 for HVAC system can be engaged to enable transfer of HVAC utility between wall panel 420 and floor panel 440. Utility connection 410 for plumbing can also then be engaged to enable transfer of water between wall panel 420 and floor panel 440. In various embodiments, the structural connection can be made first and then the MEP connection which can allow for the positioning of the panels in in the correct location, or at least within a threshold location a reference or other such position.

Figure 5A:
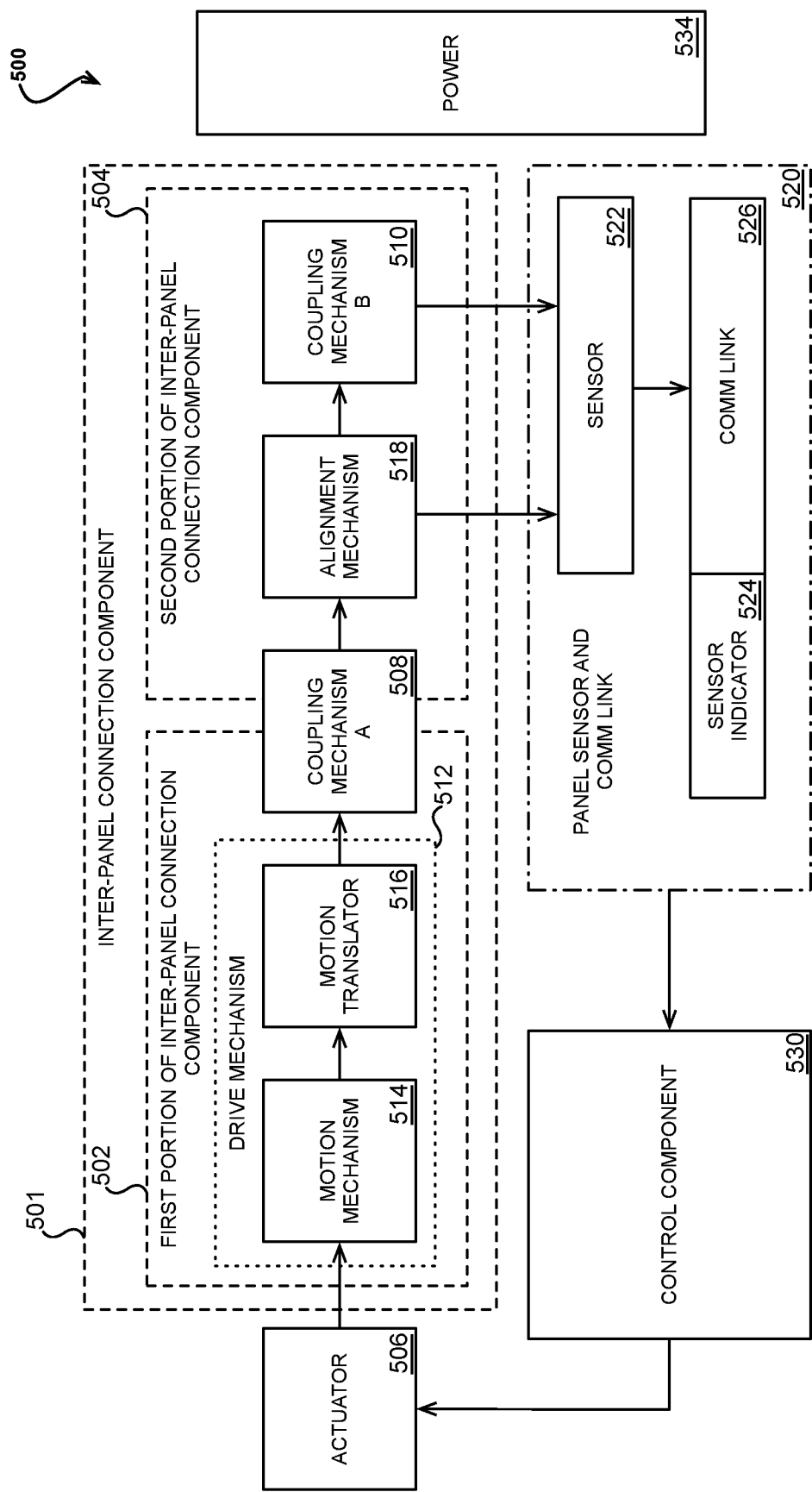
FIGS. 5A and 5B illustrate block diagrams of a connector system of the closed-panel building system in accordance with various embodiments.

FIG. 5A illustrates a block diagram 500 illustrating functional elements of a connection system in accordance with an embodiment. In this example, the connection system includes an interpanel connection component 501 operable to connect a first building panel to a second building panel. The interpanel connection component 501 includes a first portion 502 and a second portion 504. The first portion 502 of the interpanel connection component is attached to the first building panel and the second portion 504 of the interpanel connection component is attached to the second building panel. In an embodiment, an interpanel connection 501 is formed when the first portion 502 of the interpanel connection component couples to the second portion 504 of the interpanel connection component in accordance with a threshold criteria. The threshold criteria can include a threshold distance, alignment, etc. In certain embodiments, one or more criteria are met to satisfy a connection.

The first portion 502 of the interpanel connection component contains the drive mechanism 512 and coupling mechanism A 508. The drive mechanism includes a motion mechanism 514 and a motion translator 516. The second portion 504 of the interpanel connection component includes the coupling mechanism B 510.

Actuator 506 provides energy/power 534 used to create movement that causes coupling mechanism A 508 and coupling mechanism B 510 to mate. For example, drive mechanism 512 translates the actuator motion into coupling mechanism A 508 motion via a motion mechanism 514 that couples to the actuator 506 and a motion translator mechanism 516 which translates the actuator motion to a directional motion to advance the coupling mechanism A 508. In accordance with an embodiment, the source of the energy/power source can originate from, for example, a manual-based motion input source, a pneumatic-based motion input source, a hydraulic-based motion input source, an electric-based (e.g., battery or wired) motion input source, a magnetic-based motion input source, an electro-magnetic-based motion source, a wireless RF-based input source, among other such input sources. Coupling mechanism A and coupling mechanism B can include, for example, a snap connector mechanism or other such interlocking connector mechanism, magnetic locking mechanism, thread road locking mechanism, bolt mechanism, cam locking mechanism, latch locking mechanism, electromagnetic connector mechanism, dual orthogonal V-groove mechanism, size graduated stacked vertical elements mechanism, multiple planar elements mechanism, tube to circular slit mechanism, retractable male element mechanism, which may be engaged or disengaged pneumatically, electrically, manually, hydraulically, etc.

In accordance with various embodiments, interpanel connector components 502, 504 have the ability to adjust their positions in response to the stress applied to the force generated by the alignment mechanism 518. This alignment can be passive or active. In certain embodiments, the interpanel connector components are configured to absorb or otherwise reduce an amount of misalignment in the connection without compromising the connection.

As coupling mechanism A is advanced, alignment mechanism 518 guides coupling mechanism A 508 into coupling mechanism B 510. The alignment mechanism 518 allows for the adjustment of small misalignments between coupling mechanism A 508 and coupling mechanism B 510. In certain embodiments, coupling mechanism A 508 engages the alignment mechanism 518 prior to engaging with coupling mechanism B 510. The elements of the alignment mechanism 518 can be included in either or both of the first portion 502 of the interpanel connection component or the second portion 504 of the interpanel connection component.

Motion translator 516 can engage a connector, such as the utility connector 300 in FIG. 3, when the motion translator 516 translates motion based at least in part on of a manual-based motion input source, a pneumatic-based motion input source, a hydraulic-based motion input source, an electric-based motion input source, a magnetic-based motion input source, or an electro-magnetic-based motion source.

A panel sensor and communication link component 520 includes one or more sensors 522, a sensor indicator 524, and a communication link 526. In an embodiment, sensor(s) 522 can provide state information determined by sensor indicator 524 from sensor information about the connector components and the panels. The state information can be determined from, for example, sensor information such as position information, environmental information, force information, resistance information, capacitance information, pressure information, stress information, torque information, alignment information, inductance information, temperature information, humidity information, etc., associated with a connection between panels and/or interpanel connection components.

Position information can include, for example, a position of a building element with respect to a different building element and/or reference point. As described herein, building elements include, for example, panels, connectors, and the like. Environment information can include, for example, temperature, humidity, moisture, and other such information. Force information can include, for example, an amount of push or pull on a building element and/or sensors coupled to the building element or in proximity to the building element. Force can be associated with both a magnitude and direction. An example unit of force is newton. Resistance information can include, for example, an amount of resistance between building elements and/or sensors coupled to the building elements or in proximity to the building elements. An example unit of resistance is ohm. Capacitance information can include, for example, an amount of capacitance between building elements and/or sensors coupled to the building elements or in proximity to the building elements. An example unit of capacitance is Farad. Pressure information can include, for example, an amount of pressure between building elements and/or sensors coupled to the building elements or in proximity to the building elements. An example unit of pressure is pascal. Stress information can include, for example, an amount of stress on a building element and/or sensors coupled to the building element or in proximity to the building element. An example unit of stress can be measured in force per area. Torque information can include, for example, an amount of torque on a building element and/or sensors coupled to the building element or in proximity to the building element. An example unit of torque can be measured in pounds-inch. Alignment information can include, for example, the angels and/or position of building components with respect to other building components and/or a reference point.

One or more types of sensors can be used to obtain such information between and/or on building elements. For example, one type of sensor is a position sensor, which measures the relative position of the coupling mechanism A 508 to the coupling mechanism B 510. One variant of this type of sensor is a proximity sensor. Another type of sensor is one that detects force. An example of a force sensor is a strain gauge that senses the amount of strain between coupling mechanism A 508 and coupling mechanism B 510. Yet another type of force sensor is a structural pressure sensor (in contrast to a hydraulic or pneumatic pressure sensor). Another type of force sensor is a torque sensor. Each of these sensor types may be implemented using a number of electro-magnetic properties, such as capacitance, inductance, resistance. Still other implementations use various optical, mechanical and material properties.

In the case of utility connections, there may be additional sensors that detect the performance of the connection. For example, for electrical connectors the electrical impedance could be measured across the connection. For water connectors, the sensor could be a pressure sensor and/or a flow rate sensor, temperature sensor. More than one sensor type may be used.

The sensor state may also be interrogated over the course of the life of the system to assist in trouble shooting utility and structural issues, and for periodic maintenance.

The state/condition of the sensor is transmitted via communication link 526 to the control component 530 using one or more communication approaches. One of such approach is an electrical communication signal. Another such approach is an optical communication signal. Another approach is an LED. Another approach is an audio signal. Another approach is a haptic indicator (for example surface raises or a pop out or in pin.) Another approach is a visual indicator, such as changes in color or display. Another approach is a visual display on a display screen, smart phone, tablet, computer monitor, etc. It should be noted other approaches are contemplated within the teachings described herein.

The state information can be processed to generate control information that can be used to control one or more components. For example, the control information can be used to facilitate the coupling of the interpanel connector elements, and algorithmically determine the optimal connection sequence, connection speed rate, and tightening force, determined by factors such as the thermal coefficient of the panels based on the weather conditions, another such factor is connecting multiple connectors simultaneously.

In accordance with various embodiments, the connection system operates in a closed-loop system in that the actuator operating state (e.g., power, speed, orientation, location) can be controlled by the feedback from the sensor conditions. There are many possible actuator and actuator controller implementations. Consider that one simple implementation is an installer with a handheld electrical drill watching the state of an LED, such that when the LED turns on the installer turns off the drill. The advantage of this system is that it uses no special equipment.

Figure 5B:
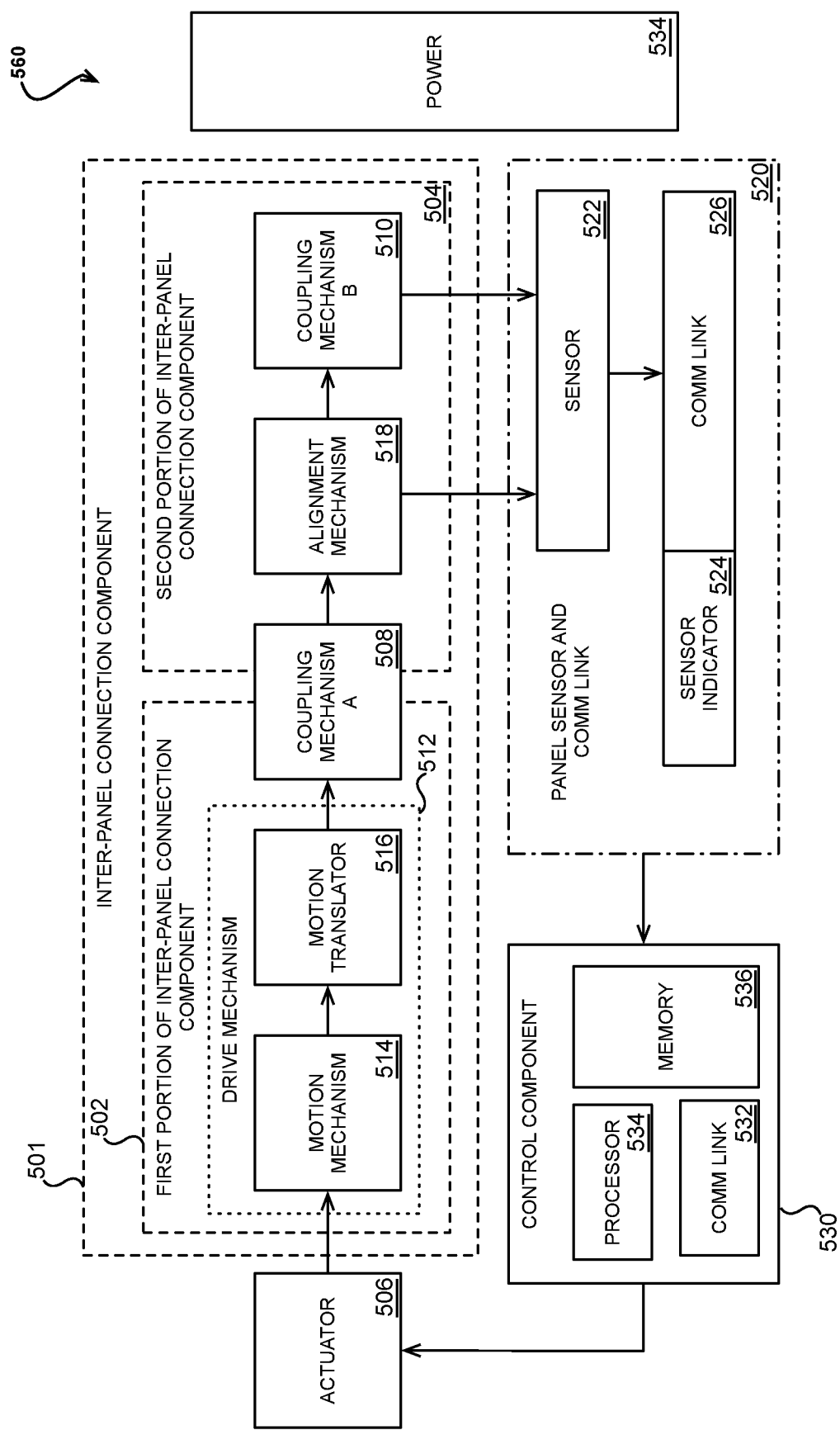

FIG. 5B illustrates a block diagram 560 showing functional elements of a connection system similar to FIG. 5A, in accordance with an embodiment. In this example, control component 530 is a machine-based controller with a communication link 532, processor 534, and memory 536. Communication link 532 can include, for example, a modem, a network card (wireless or wired), an infrared communication device, etc. Memory 536 can include, computer-readable storage medium representing remote, local, fixed and/or removable storage devices as well as storage media for temporarily and/or more permanently containing, storing, transmitting and retrieving computer-readable information. Processor 534 can include, for example, at least one central processing unit (CPU).

Control component 530 is in communication with sensor array 522. Based on the state of the sensor array, or other information such a configuration file, control component 530 can process the information to automatically perform one or more actions. As described, the information includes, for example, position information, location information, alignment information, etc. of a connection between panels and/or interpanel connection components, among other such information. A configuration file can include, for example, instructions that when processed by the appropriate component can cause panels to be coupled in a particular order and/or arrangement.

In an embodiment, information can be received at control component 530, and control component 530 can control actuator's 506 state (power, speed, orientation, location). In this example, each connection can be associated with a file describing the details regarding a particular connection, including time, installer name, sensor turn-off state. In another example, the sensor state can signal to the installer when a connection is complete (or that a connection failed) and can direct the installer to the next interpanel connection component to engage when the connection is complete. The custom actuator could also log the data for each connection which could be used for inspector reviews or other such purpose. Yet another example is an actuator 506 with a torque limiter such that when the torque exceeds a certain predetermined value the force delivered by the actuator is mechanical disengage by a slip in coupling or the power is controlled via feedback control. An advantage to such an approach is that components can be preprogrammed for the speed of engagement of the coupling mechanisms and the threshold for disengaging the power to the drive of the actuator. This results in time savings and more consistent connections. Further, the data log for each connection would be available for inspector reviews.

There are many possible ways the functionality in FIG. 5B can be partitioned. For example, the controller component 530 can be integrated into a custom handheld actuator 506. Another example is the controller component 530 is centralized and can communicate to multiple interpanel connection components 501 and hand-held actuators 506. A variation of the examples above is if the actuator 506 is integrated into the panels. Another example is an installer with a custom actuator.

Electrical power may be required depending on the nature of the sensor and the means of communicating the state of that sensor to the user, and can be provided by power component 534. There are multiple ways the electrical power could be delivered, including, for example, hardwired or RF transmission for example. An example of powering the connector system feedback system is for a custom actuator described above. For example, the head of the custom actuator could use an inductive coupled power system to transmit power from the actuator to the connector system inside of the panel. Yet another example is a direct electrical wire connection from the custom actuator to the connector system inside of the panel. Another example of delivering power to the interior of the close panels is via an extendable power system though a panel to panel connector.

In an embodiment, multi-state processing is when multiple structural and utility connections are made in the same time period. The processor considers a number of different inputs and deciding hierarchy for engagement. For example, the system may tighten a predetermined number of structural connectors to 85% then make the utility connections and then complete the structural connections. This sequence may vary from panel to panel. By engaging multiple connectors in the same time frame creates a smoother connection and reduces installation time. It also reduces the chance of a binding connection due to misalignment in the panels.

In other embodiments, the connection system may include a security feature that blocks that disengagement (or engagement) of the connector system by unauthorized personnel that can be enabled in a number of different ways, including, for example, the mechanical interface to the actuator, e.g. the physical shape of the actuator, may be non-standard and would require a special tool, an electronic code is required to be transmitted that allows for the mechanical coupling to occur, where the mechanical couple may between the actuator and the drive mechanism or other parts of the mechanical power transmission system, and/or an electro-magnet must be energized in order for the mechanical transmission system to be functional.

Figure 6:
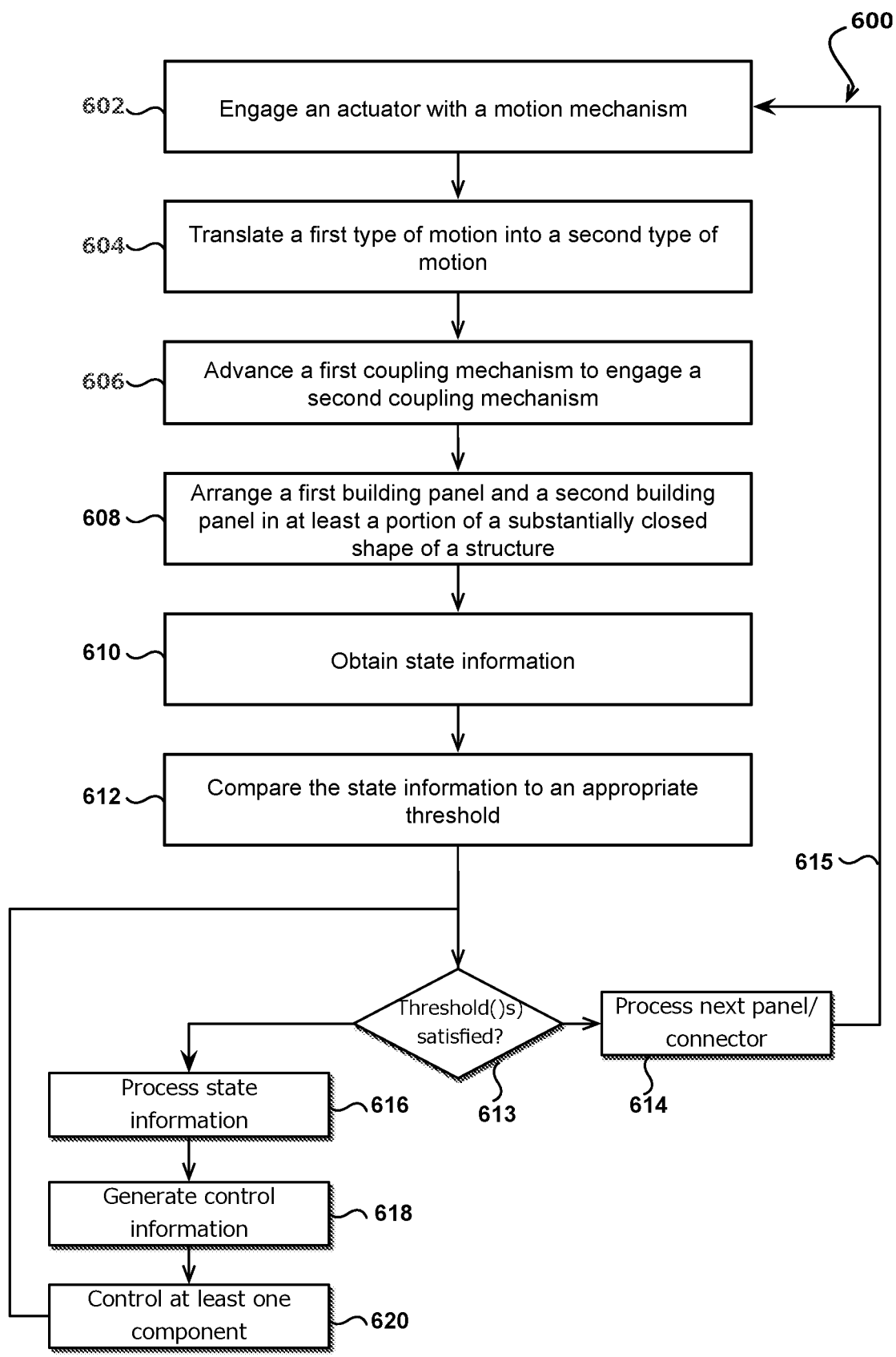
FIG. 6 illustrates an example process for automatically coupling interpanel connectors in accordance with various embodiments.

FIG. 6 illustrates an example process 600 for automatically coupling interpanel connectors and/or panels in accordance with various embodiments. It should be understood that, for any process described herein, that there can be additional or fewer steps performed in similar or alternative orders, or in parallel, within the scope of the various embodiments unless otherwise stated. In this example, an actuator is engaged 602 with a motion mechanism. The actuator provides, for example, the energy/power for the motion mechanism to generate a first type of motion. The first type of motion is translated 604 into a second type of motion, where the first type of motion can be rotational motion and the second type of motion can be directional motion along a particular path. Rotational motion can include motion around a fixed axis or about a fixed axis of revolution or motion with respect to a fixed axis of rotation. Directional motion can be motion in a particular direction or path with respect to a coordinate system such as the Cartesian coordinate system. The second type of motion can advance 606 a first coupling mechanism to engage a second coupling mechanism. In accordance with an embodiment, the first coupling mechanism can be associated with a first portion of an interpanel connection component and the second coupling mechanism is associated with a second portion of the interpanel connection component, where a first building panel includes the first portion of an interpanel connection component and a second building panel includes the second portion of the interpanel connection component. Advancing the first and second coupling mechanisms can arrange 608 the first building panel and the second building panel in at least a portion of a substantially closed shape of a structure.

State information is obtained 610. The state information can be obtained at, for example, a control component or another appropriate component. The state information can be determined from, for example, information such as position information, environmental information, force information, resistance information, capacitance information, pressure information, stress information, torque information, alignment information, etc., associated with a connection between panels and/or interpanel connection components and collected by one or more sensors.

The state information can be compared 612 to an appropriate threshold. Thresholds can include, at least one of a position threshold, resistance threshold, capacitance threshold, inductance threshold, pressure threshold, torque threshold, stress threshold, temperature threshold, or humidity threshold. In an embodiment, a threshold can be dynamically updated. For example, a threshold can be updated based on a particular project, work environment, sensor information or other such information. The type of threshold(s) used can be based on the type of state information obtained. For example, state information that includes position information and resistance information may be compared against a position threshold and/or resistance threshold. Whether the threshold(s) is satisfied can be based on comparison score that considers the number of comparisons. In certain embodiments, the comparison score can be a weighted score, where individual comparisons may be weighted.

A determination 613 is made whether the state information satisfies the appropriate threshold. In the situation where the state information satisfies the threshold, the next panel and/or connector can be processed 614. In certain embodiments, a notification can be presented. The notification can include at least one of a visual notification, an audible notification, a haptic notification, a digital signal, an analog signal, or an electronic message notification. The process can continue 615 until a threshold number of panels are processed or another stop condition is met. For example, an automated connector system or other such system can receive instructions to perform steps to couple the next set of panels and/or connectors in accordance with embodiments described herein. In various embodiments, at least one optimization technique can be used to couple building components within a threshold deviation based at least in part on state information or other such control signals. The process can continue and the coupled building panels can define at least a portion of a structure, where the connection components can support at least a portion of a load associated with the structure or transfer of a utility through a portion of the structure.

In the situation where the state information does not satisfy the threshold, the state information is processed 616 to generate 618 control information. The control information can be used to control 620 one or more components. For example, control information can be used to adjust one of power, speed, orientation, location of an actuator. In another example, the control information can be used to cause an actuator to engage with a motion mechanism. In yet another embodiment, an optimization technique can be used to couple coupling within a threshold deviation based at least in part on state information or other such control signals. This can include, for example, maximizing or minimizing the state information, or otherwise finding "best available" or values that satisfy one or more thresholds. In certain embodiments, models can be trained, and the trained models can be utilized to determine position of components that satisfy one or more thresholds, including, for example, position thresholds, safety thresholds, etc. The process can continue, where coupled building panels can define at least a portion of a structure and the connection components Additionally, or alternatively, in certain embodiments, a notification can be presented indicating that the current panels have yet to be processed, manual inspection is needed, user-input is required, among other such actions. Thereafter, current state information is obtained and the process continues as described herein.

Figure 7:
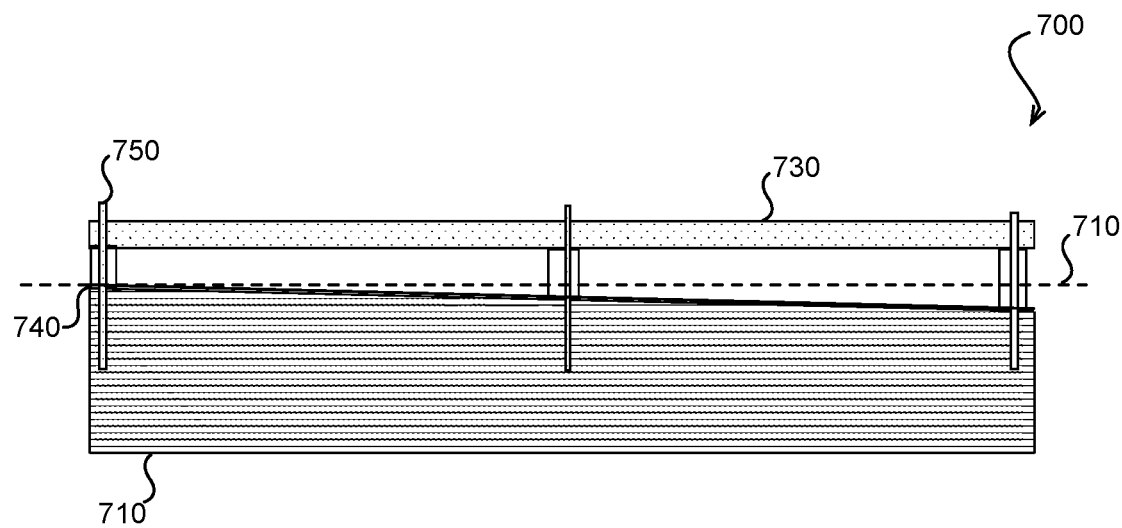
FIG. 7 illustrates an example of a foundation adaptive interface in accordance with various embodiments.

FIG. 7 illustrates an example of a foundation adaptive interface in accordance with an embodiment. In this example, a precision framing system is configured to be able to compensate for irregularities in the foundation (e.g., pile, pier, slab, post) such as in the situation where there is an irregularity in a stem wall 710, where the top of the stem wall is not parallel to true horizontal 720. It should be noted that most concrete poured foundations go through a settling process. It is therefore difficult to ascertain the system a priori; rather the irregularities must be compensated for at the time of installation.

An adaptive interface 700 shows a means of compensating for this irregularity, using a plate 730 resting on adjustable standoff elements 740, that are centered on anchor bolts 750. The adjustable standoffs are adjusted by the installer using a leveling system.

An alternative to this is to simply scribe the plate 730 to compensate for the irregularities in the stem wall 710. The top plate would be positioned between the foundation and stem wall 710 and the wall or floor panels.

Still another alternative embodiment is a cross section of a stem wall, with a deviation from true horizontal. A U-shaped metal element runs the length of the stem wall. The trough of the U-shaped metal element (to be known as the wall panel guide) is aligned with true horizontal by adjustable standoffs centered on anchor bolts. The wall panel guide serves as a cradle for a wall panel, which effectively extends the stem wall and acts as a support for a floor panel.

An aspect of the system is the alignment of adjacent panels using alignment elements as shown in FIGS. 8A, 8B, 9A, 9B, 9C, 9D, and 10. In accordance with various embodiments, different types of alignment accounted for include panel alignment and alignment between elements of the interpanel connection elements. This section is dedicated to the panel alignment. It is the panel alignment which places the panels in the proper position prior to connection. Panel alignment mechanisms are responsible in part for minimizing tolerance stack-up in the panels. Panel alignment places connector component pairs with sufficient accuracy such that any offset between connector component pairs is within the range of the connector system to absorb the stress applied by the connector alignment mechanisms.

Figures 8A, 8B:
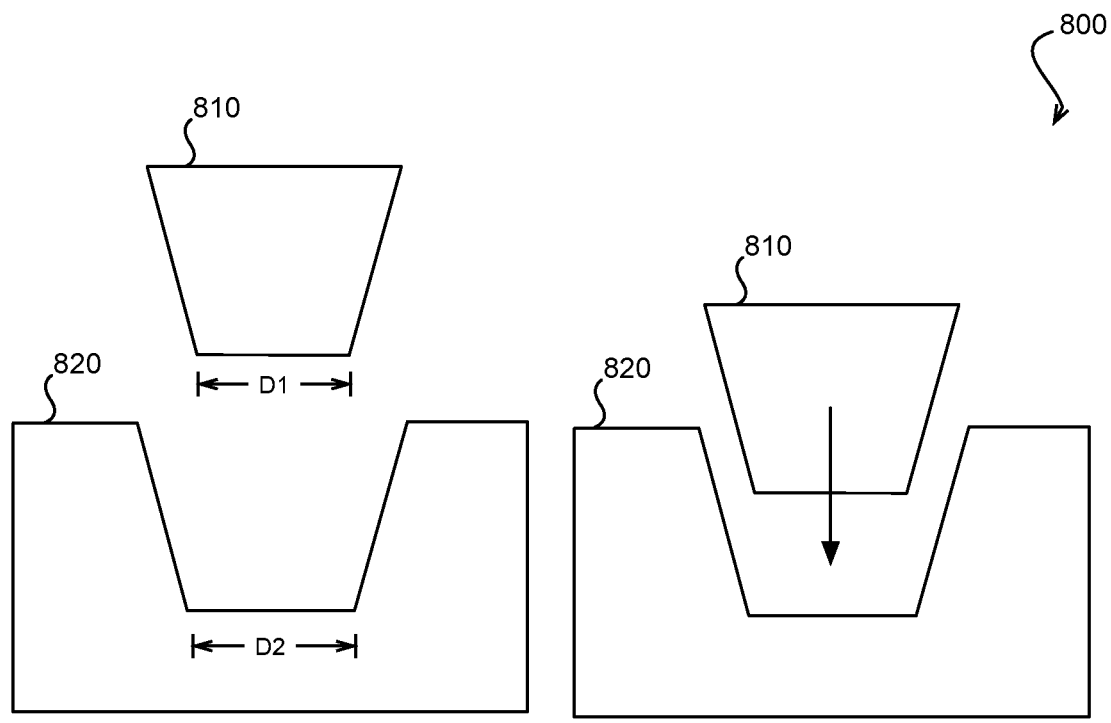
FIGS. 8A and 8B illustrate various views of a panel alignment element pairing in accordance with an embodiment.

FIGS. 8A and 8B illustrate an example of an interpanel element pair 800. In this example, the alignment dimensions are d1 and d2. d2=d1+Δ, where Δ is typically on the order of 0.5 mm. Panel alignment element 810 engages with panel alignment element 820. A feature of the panel alignment mechanism is the ability to initially engage the two adjacent panels with a relatively large offset from true position and to reduce the offset as the alignment elements become fully engaged.

There are many types of possible panel alignment implementations: 1) dual orthogonal V-groove, 2) size graduated stacked vertical elements, 3) multiple planar elements, and 4) tube to circular slit. Other implementation options include, for example, a retractable "male element," which may be engaged or disengaged pneumatically, electrically, manually, hydraulically, etc. Active panel alignment elements using electromagnetic forces, for example. Panel alignment elements combined with connectors (utility or structural). Pass shear forces through the alignment elements—good for protection in earthquakes, allowing alignment pins pop off at a specified force rating.

The alignment components can be multipurpose. For example, one purpose can include the alignment of the panels. Another purpose can include being used as calibrated week point in the panel-to-panel connection system so that in a seismic event the alignment connectors would be the first to fail. The alignment connecters can also be designed to automatically reposition themselves after a seismic event resulting in realignment of the panels to their original position.

Figure 9A:
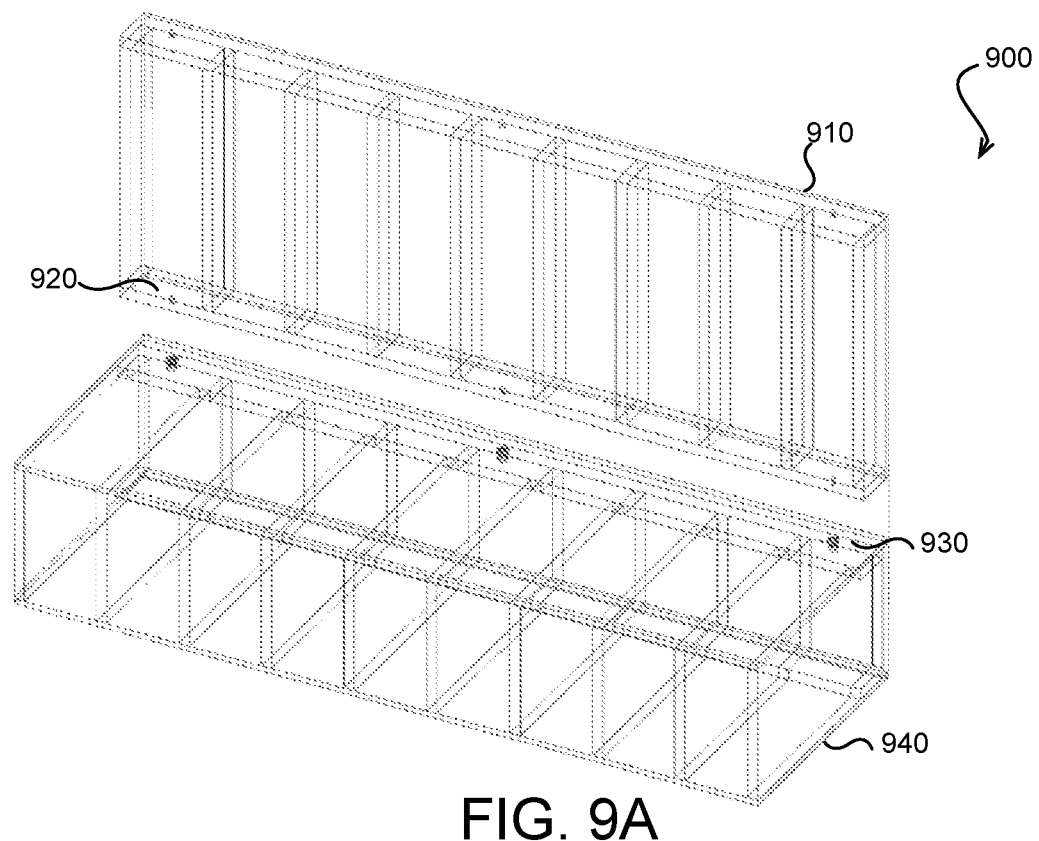
FIGS. 9A, 9B, 9C, and 9D illustrate various views of a panel alignment mechanism for a wall panel to floor panel alignment element pairing in accordance with an embodiment.
Figure 9B:
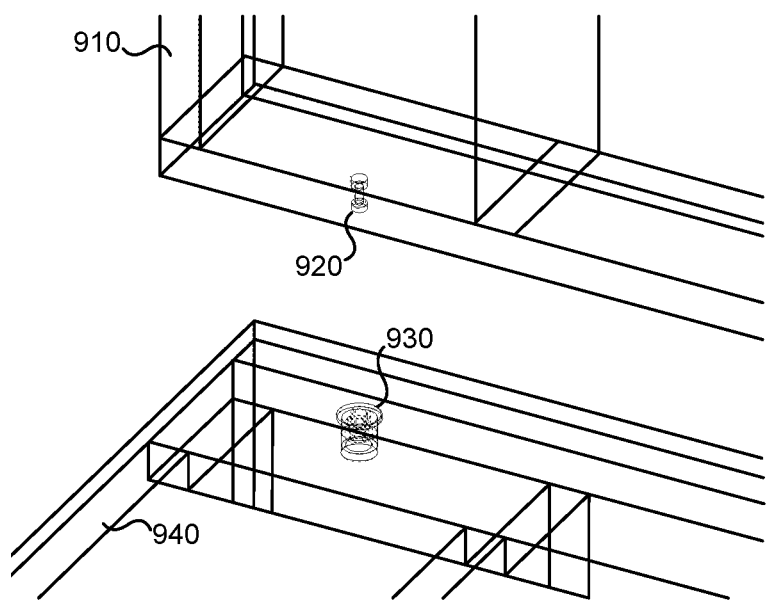
Figure 9C:
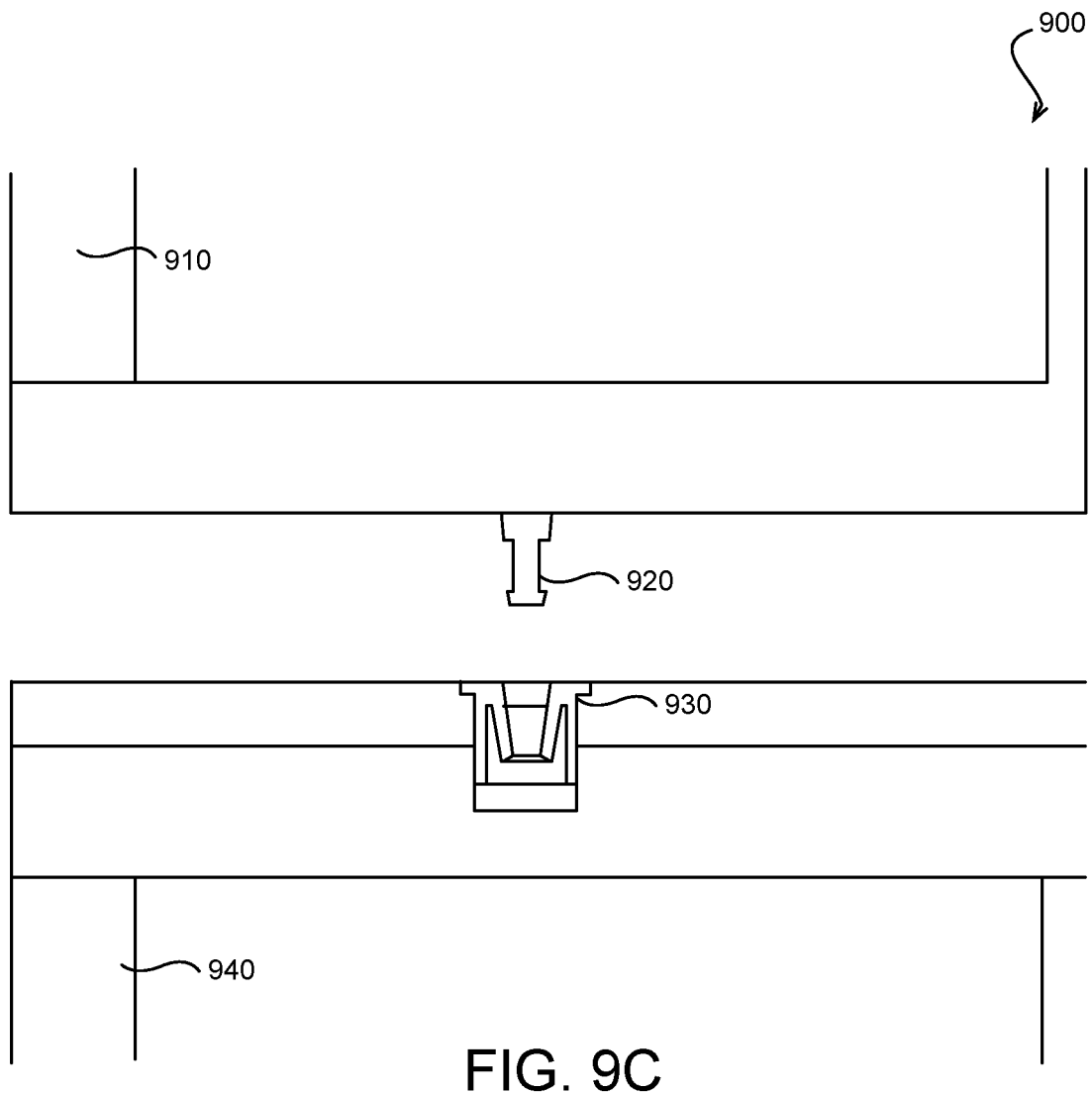
Figure 9D:
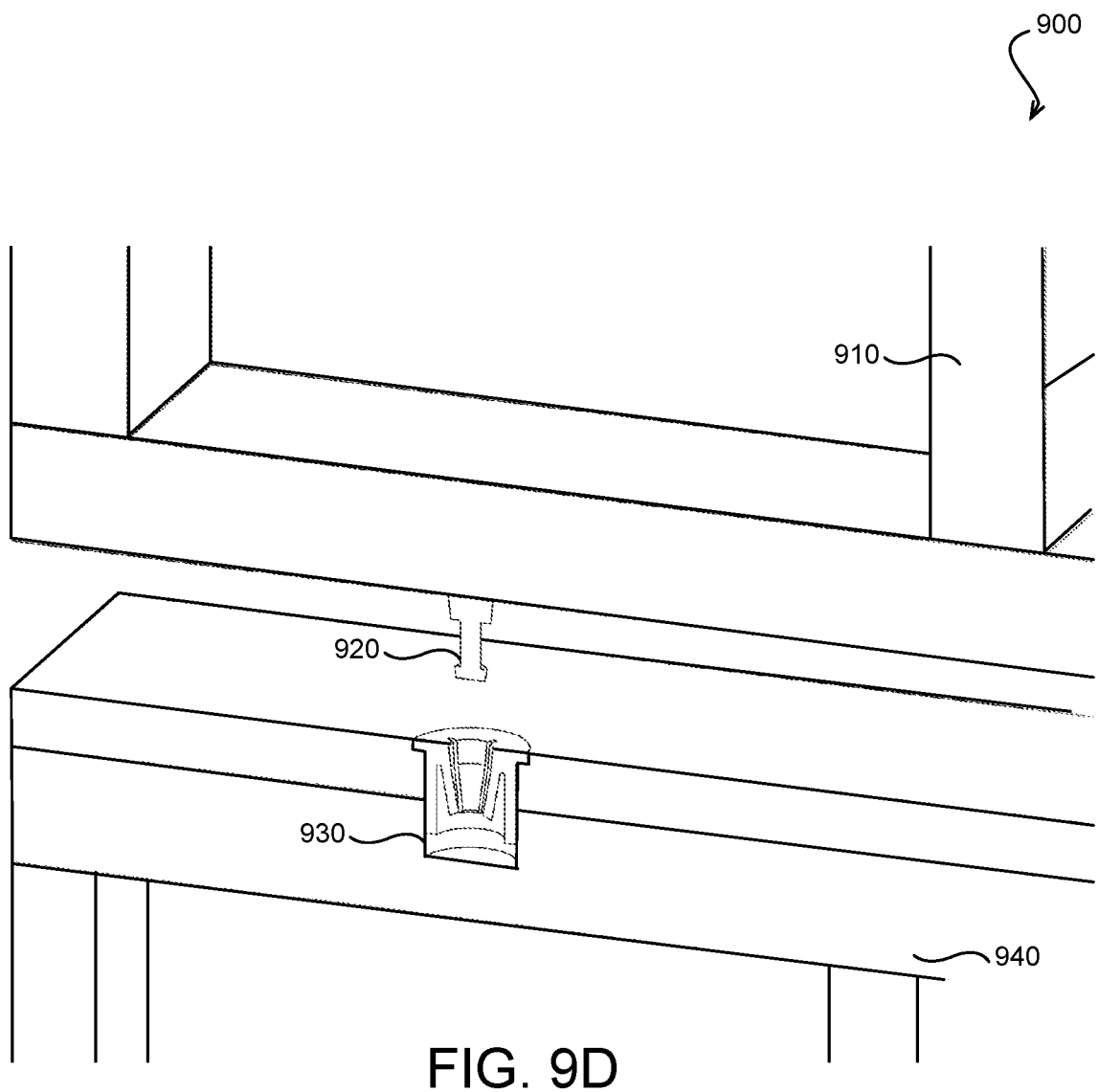

FIGS. 9A, 9B, 9C, 9D illustrate different views of an embodiment of an interpanel connection system 900. FIG. 9A shows a front perspective sectional view of the interpanel connection system 900. Element 910 is a wall panel. Element 920 is the male portion of the alignment system, that is attached to the wall panel 910. Element 940 is a floor panel. Element 930 is the female portion of the alignment system. In one embodiment, the male portion of the alignment element 920 is conically shaped, tapered to a cross section that is slightly smaller than the base of the female portion of the alignment element 930. A certain type of panel alignment can also be designed with a locking mechanism for a single use application. Once it is engaged, it won't be, or at least is difficult to retract without damage to the panel or some other component. FIG. 9B provides a close-up perspective view of the male portion of the alignment element 920 and female portion of the alignment element 930 in the interpanel connection system 900. FIG. 9C provides a close-up front view of the interpanel connection system 900, showing the alignment of the male portion of the alignment element 920 and female portion of the alignment element 930. FIG. 9D shows a close up perspective sectional view of the alignment of the male portion of the alignment element 920 and female portion of the alignment element 930 in the interpanel connection system 900.

Figure 10:
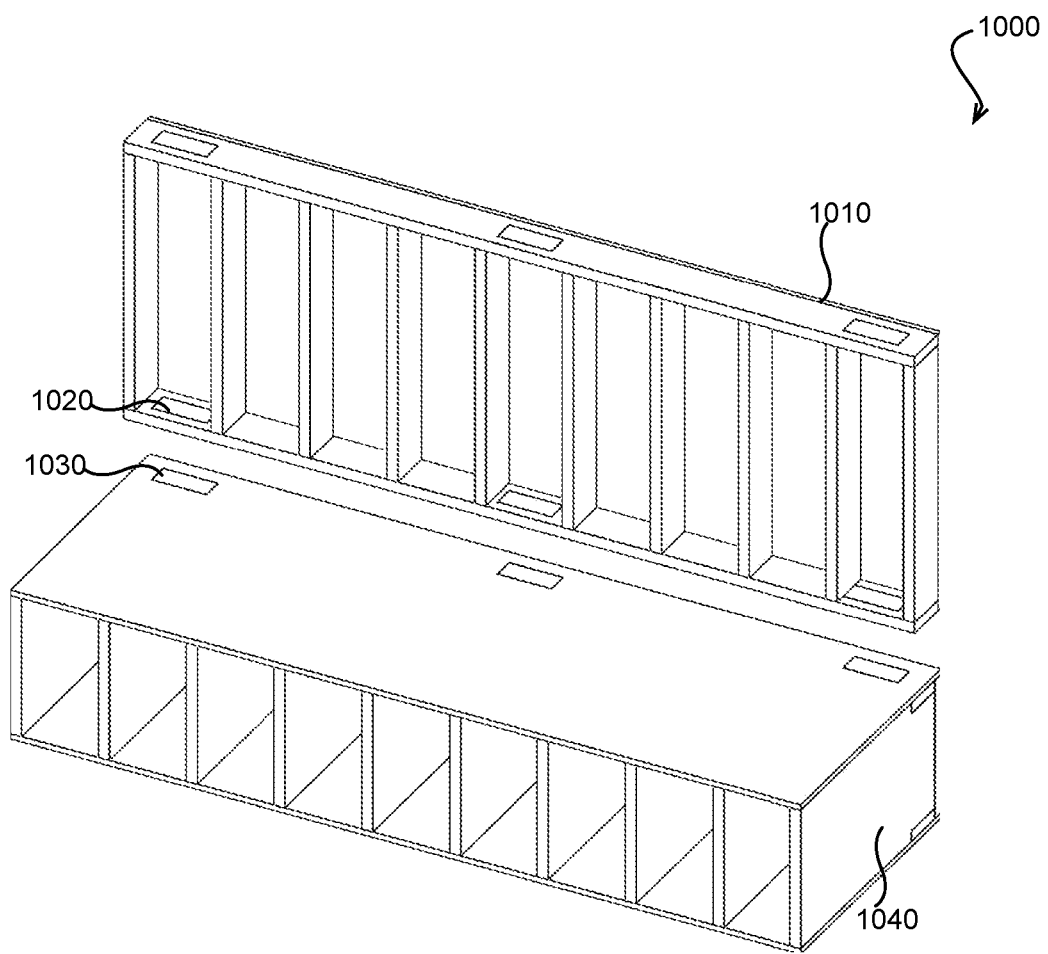
FIG. 10 illustrates an alternative panel alignment mechanism in accordance with an embodiment.

FIG. 10 shows an alternative panel alignment system 1000. Element 1010 is a wall panel and element 1040 is a floor panel. Element 1020 and element 1030 are electromagnetic couplers of opposite polarities when energized. When the elements 1020 and 1030 are energized they create an electromagnetic filed which pulls the wall panel 1010 and floor panel 1040 together and locks it in place. Note that it is possible to create a hybrid system which combines both types of elements in single element or co-existing separate elements on the sample panel. In an embodiment, the utility connection alignment satisfies precision for water and waste connections. One method of accomplishing this is through floating utility connection, by using piping that is flexible prior to attaching to the utility side of the male and female connectors. Another way is to create a semi floating connector that has a small degree of adjustment to allow for any misalignment between the connectors.

Figure 11:
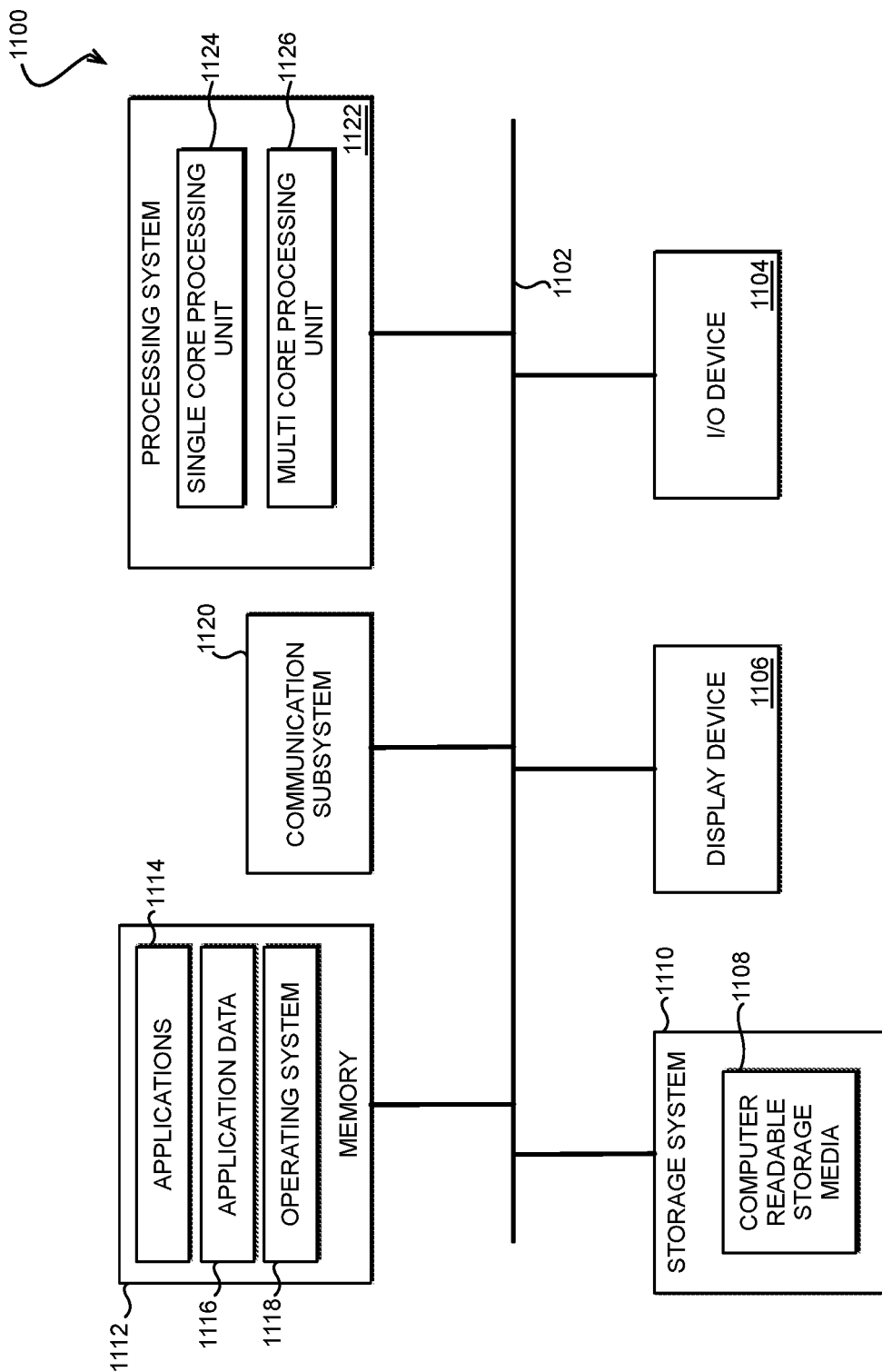
FIG. 11 illustrates an example computer system, in accordance with various embodiments.

FIG. 11 illustrates a set of basic components of an electronic computing device. In various embodiments, computer system 1100 may be used to implement any of the systems, devices, or methods described herein. In some embodiments, computer system 1100 may correspond to any of the various devices described herein, including, but not limited, to mobile devices, tablet computing devices, wearable devices, personal or laptop computers, vehicle-based computing devices, or other devices or systems described herein. As shown in FIG. 11, computer system 1100 can include various subsystems connected by a bus 1102. The subsystems may include an I/O device subsystem 1104, a display device subsystem 1106, and a storage subsystem 1110 including one or more computer-readable storage media 1108. The subsystems may also include a memory subsystem 1112, a communication subsystem 1120, and a processing subsystem 1122.

In system 1100, bus 1102 facilitates communication between the various subsystems. Although a single bus 1102 is shown, alternative bus configurations may also be used. Bus 1102 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1102 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1104 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1104 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1100 may include a display device subsystem 1106. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1106 may include a controller and/or interface for controlling and/or communicating with an external display, such as any of the above-mentioned display technologies.

As shown in FIG. 11, system 1100 may include storage subsystem 1110 including various computer-readable storage media 1108, such as hard disk drives, solid-state drives (including RAM-based and/or flash-based SSDs), or other storage devices. In various embodiments, computer-readable storage media 1108 can be configured to store software, including programs, code, or other instructions, that is executable by a processor to provide the functionality described herein. For example, the instructions, when executed, can enable a computing device to perform automated document negotiation in accordance with the present disclosure may be embodied on a computer-readable medium. This may include automatically obtaining information from parties seeking to negotiate document sections of a document such as a contract; generating a ranking value or other such document selection value for a plurality of candidate contracts possible between the parties based on information from the parties, including their preferences for different sections (e.g., provisions) of the contract; and using the values to optimize an optimization function (e.g., a cost function or other such function) that measures the degree to which candidate contracts satisfy the information provided by the parties to determine a document or document information that satisfies constraints of the parties.

In some embodiments, storage system 1110 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1110 can include a media reader, card reader, or other storage interfaces to communicate with one or more external and/or removable storage devices. In various embodiments, computer-readable storage media 1108 can include any appropriate storage medium or combination of storage media. For example, computer-readable storage media 1108 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1112 can include various types of memory, including RAM, ROM, flash memory, or other memory. Memory 1112 can include SRAM (static RAM) or DRAM (dynamic RAM). In some embodiments, memory 1112 can include a BIOS (basic input/output system) or other firmware configured to manage initialization of various components during, e.g., startup. As shown in FIG. 11, memory 1112 can include applications 1114 and application data 1116. Applications 1114 may include programs, code, or other instructions, that can be executed by a processor. Applications 1114 can include various applications such as browser clients, campaign management applications, data management applications, and any other application. Application data 1116 can include any data produced and/or consumed by applications 1114. Memory 1112 can additionally include operating system 1118, such as macOS®, Windows®, Linux®, various UNIX® or UNIX- or Linux-based operating systems, or other operating systems.

System 1100 can also include a communication subsystem 1120 configured to facilitate communication between system 1100 and various external computer systems and/or networks (such as the Internet, a local area network (LAN), a wide area network (WAN), a mobile network, or any other network). Communication subsystem 1120 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1120 can include hardware and/or software components to communicate with satellite-based or ground-based location services, such as GPS (global positioning system). In some embodiments, communication subsystem 1120 may include, or interface with, various hardware or software sensors. The sensors may be configured to provide continuous or and/or periodic data or data streams to a computer system through communication subsystem 1120.

As shown in FIG. 11, processing system 1122 can include one or more processors or other devices operable to control computing system 1100. Such processors can include single-core processors 1124, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1122, such as processors 1124 and 1126, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A building system, comprising:
    a plurality of building panels, at least one building panel of the plurality of building panels used to build a structure, the at least one building panel being a substantially closed-panel, wherein the closed-panel is a prefabricated panel that includes housing to contain at least one interpanel connection component;
    a plurality of interpanel connection components configured to at least couple a first building panel of the plurality of building panels to a second building panel of the plurality of building panels, wherein coupling the first building panel to the second building panel enables at least one of supporting a portion of a load associated with the structure by at least one interpanel connection component of the plurality of interpanel connection components or enabling transfer of a utility through a portion of the structure by at the least one interpanel connection component; and
    a sensor configured to determine state information to facilitate coupling of the plurality of interpanel connection components.

2. The building system of claim 1, wherein embedded in the at least one building panel is a panel alignment element to facilitate alignment between a first interpanel connection component of the first building panel and a second interpanel connection component of the second building panel.

3. The building system of claim 1, wherein the at least one building panel-includes at least one of a moisture control barrier, a temperature control layer, a weathering layer, an insulation layer, a fire protection layer, a window frame, or a door frame.

4. The building system of claim 1, wherein at least a portion of material of the at least one building panel is at least one of plywood, densified wood, fiberboard, particle board, oriented strand board, laminated timber, laminated veneer, laminated veneer lumber, cross laminated timber, parallel strand lumber, laminated strand, transparent wood composites, composites, polymers, metals, glass fiber, carbon fiber, or structural fibers.

5. The building system of claim 1, wherein a width dimension, a length dimension, and a height dimension of the at least one building panel satisfies respective dimension thresholds over a range of values for at least one environmental condition.

6. The building system of claim 1, wherein the at least one interpanel connection components includes one of a structural connector, a utility connector, or a combination structural and utility connector.

7. The building system of claim 6, wherein the structural connector is configured to enable at least one of support a portion of a load associated with the structure or align a pair of building panels of the plurality of building panels, and wherein the utility connector is configured to enable transfer of a utility through a portion of the structure, and wherein the combination structural and utility connector is configured to enable at least one of the support the portion of the load associated with the structure, align the pair of building panels of the plurality of building panels, or transfer the utility through the portion of the structure, and wherein the utility includes at least one of fluid, gas, electricity, communications data, air, or waste.

8. The building system of claim 1, wherein an interpanel connection component includes a first portion and a second portion, the first portion is coupled to the first building panel and the second portion is coupled to the second building panel, and wherein an interpanel connection is formed when the first portion couples to the second portion.

9. The building system of claim 1, wherein the first coupling mechanism engages an alignment element component prior to engaging the second coupling mechanism.

10. The building system of claim 1, further comprising:
    a notification component configured to communicate a notification when the state information satisfies a threshold.

11. A building panel, comprising:
    a housing configured to contain at least one interpanel connection component;
    a set of interpanel connection components contained within the housing, the set of interpanel connection components including a structural connector and a utility connector, the structural connector configured to support a portion of a load associated with a structure, the utility connector configured to transfer of a utility through a portion of the structure; and
    a sensor configured to detect a position of a first building panel with respect to a second building panel.

12. The building panel of claim 11, further comprising:
    a panel alignment element to facilitate alignment between a first interpanel connection component of the first building panel and a second interpanel connection component of the second building panel.

13. The building panel of claim 12, wherein the panel alignment element is operable to reduce an amount of offset between the first interpanel connection component and the second interpanel connection component a threshold amount.

14. The building panel of claim 11, further comprising:
    one of a moisture control barrier, a temperature control layer, a weathering layer, an insulation layer, or a fire protection layer.

15. The building panel of claim 11, wherein a material of the building panel is one of plywood, densified wood, fiberboard, particle board, oriented strand board, laminated timber, laminated veneer, laminated veneer lumber, cross laminated timber, parallel strand lumber, laminated strand, transparent wood composites, composites, polymers, metals, glass fiber, carbon fiber, or structural fibers.

16. The building panel of claim 11, wherein a width dimension, a length dimension, and a height dimension of the at least one building panel satisfies-respective dimension thresholds over a range of values for at least one environmental condition.

17. The building panel of claim 11, wherein an interpanel connection component includes a first portion and a second portion, the first portion is coupled to the first building panel and the second portion is coupled to the second building panel, and wherein an interpanel connection is formed when the first portion couples to the second portion.

18. The building system of claim 10, wherein the notification includes at least one of a visual notification, an audible notification, a haptic notification, a digital signal, an analog signal, or an electronic message notification.

\* \* \* \* \*